Dec. 22, 1942.    P. M. HEINMILLER ET AL    2,305,704
INTERLOCK FOR TRACTORS AND SEMITRAILERS
Filed July 30, 1940    3 Sheets-Sheet 1

Inventors.
Percival M. Heinmiller.
Charles F. Roginson.

Attorneys.

Inventors.
Percival M. Heinmiller.
Charles F. Roginson.

Attorneys.

Patented Dec. 22, 1942

2,305,704

UNITED STATES PATENT OFFICE 2,305,704

INTERLOCK FOR TRACTORS AND SEMITRAILERS

Percival M. Heinmiller and Charles F. Roginson, Los Angeles, Calif., assignors to Utility Trailer Manufacturing Company, Los Angeles, Calif., a corporation of California Application July 30, 1940, Serial No. 348,394

18 Claims. (Cl. 280—33.1)

This invention has reference to interlocking mechanisms for semi-trailer combinations, having the function of controllingly interlocking the operation of raising and lowering the trailer support with the operation of coupling and uncoupling the tractor and the trailer.

In the vehicular combination which involves a semi-trailer and a supporting and towing tractor, the trailer is commonly provided with a forward support which may be lowered to support the forward end of the trailer when not supported by the tractor, and which may be raised out of the way when the forward end of the trailer is supported by the tractor. As commonly operated, the trailer is supported on its forward support at all times when not supported by and coupled to the tractor. In coupling the trailer to the tractor, the rear end of the tractor is commonly backed under the trailer to pick it up, and to draft couple the tractor and trailer. The draft coupling may operate automatically by virtue of backing the tractor under the trailer, or otherwise. After the operator has assured himself that the tractor is securely coupled to the trailer, he then raises the forward trailer support, and the tractor-trailer combination is then ready to operate as a unit.

When it is desired to uncouple the tractor and trailer, the operator first lowers the forward trailer support; and then unlocks the trailer from the tractor, so that the tractor may then be driven away from the trailer, leaving the latter supported on its own support.

In the described operations, there is always the liability, due to the human factor or due to failure of mechanisms to operate as anticipated, that the forward support of the trailer may be raised before the tractor is fully and securely coupled to the trailer, resulting in the possibility that the tractor may be subsequently driven out from under the trailer when it has no support. Or, due to similar causes, there is always the possibility that, in seeking to uncouple the tractor from the trailer, the tractor may be unlocked and driven out from under the trailer before the trailer support has been lowered to its proper supporting position. It is the general purpose of this invention to provide a simple and completely dependable interlock mechanism which makes it impossible for the operator to raise the forward support of the trailer until and unless the tractor is supporting the trailer and completely draft locked to it; and also to make it impossible for the operator to unlock the draft connection between the tractor and trailer until he has put the forward trailer support in its operative trailer supporting position.

Devices are in common use in which the operation of backing the tractor under the trailer to its finally coupled position operates the trailer support to raise it, while reverse movement of the tractor away from its coupled position positively causes the trailer support to be lowered. There are certain objectionable features in those devices and operations which are entirely eliminated by the present invention. In those operations it is inherent in the nature of the mechanisms that the trailer support is being moved between operative and inoperative positions while the tractor is being moved to and from its trailer supporting position. Frequently some part of the mechanism, which is usually relatively complicated, fails to operate, with the result that heavily loaded trailers are sometimes dropped. And the mechanisms are also subject to damage when they are moved with the excess force frequently required when a truck backs under a heavily loaded trailer to pick it up and also to move its support up. In some circumstances the truck must be backed with great speed and force, and its impact with the mechanisms often renders them inoperative.

In distinction over such automatically operated devices, our invention contemplates coupling and trailer-supporting devices which are operated independently of each other, and in which the coupling operation does not actuate the trailer support. Between the two devices we provide our interlock which prevents the unlocking of the coupler until the support is fully operative, and which prevents raising the support until the tractor is fully and finally coupled to the trailer. The interlock mechanism is simple, and during the forcible coupling operation the tractor moves substantially no mechanism aside from the coupling lock. The whole arrangement is inherently more dependable than the known type referred to, and is much less liable to damage.

The nature of the invention, its aims and accomplishments, will be best understood from the following detailed description of a present preferred form and design which is illustrative and typical of the invention; reference for the purpose being had to the accompanying drawings, in which.

Figure 1:
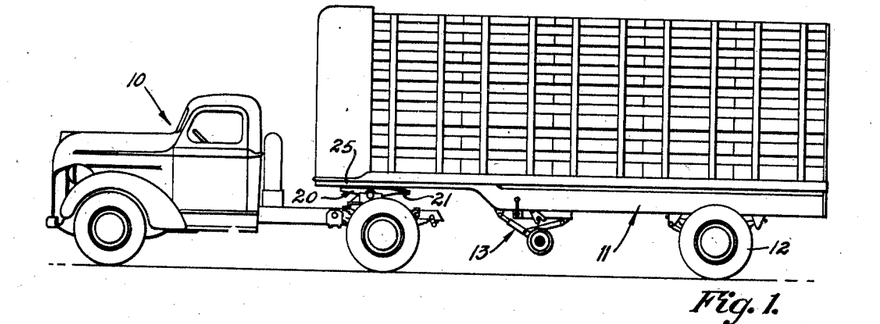
Fig. 1 is a side elevation illustrating a typical tractor-trailer unit to which our invention is applied.

A typical tractor is shown at 10 and typical trailer at 11. The rear end of the trailer is supported on rear wheels 12, and the movable supporting mechanism which is generally designated by the numeral 13 is adapted to support the forward end of the trailer when not supported by the tractor. The general nature and particular details of this forward trailer support are of no consequence to or limitation upon the invention. The support may be operable in any suitable manner and by any force to put it into and take it out of trailer supporting relation. Our interlock mechanism may be adapted to cooperate with any type of forward trailer support. The particular forward trailer support that is here illustrated, and the particular interconnection of the interlocking mechanism with that support, are merely typical.

As here illustrated, tractor 10 is shown as provided with a swivelling saddle or fifth-wheel member 20 having at its rear an incline or wedge 21 adapted to raise the forward end of the trailer as the tractor is backed up under it to effect draft coupling. In the mode of operation of that type of mechanism, the forward support 13 of the trailer is lifted off the ground by the action of backing the truck under the trailer.

Figure 4:
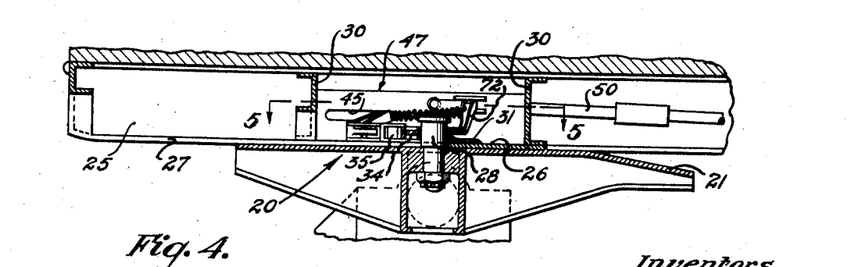
Fig. 4 is a detail longitudinal vertical section, on an enlarged scale as compared with Fig. 1, and taken as indicated by line 4—4 of Fig. 5, and showing the interlock mechanism proper.

In the devices as here illustrated, the forward end of trailer frame 25 (see Figs. 4 and 5) is typically provided on its under side with a plate 26 which has a forwardly opening slot 27, usually flared at its forward extremity, and adapted to take the king-pin 28 carried by the fifth-wheel member of the tractor. Plate 26 thus typifies the trailer-member of the fifth-wheel combination which flexibly carries the forward end of the trailer. Typically, the fifth-wheel plate 26 may be reenforced by transverse frame members 30.

On plate 26, adjacent the rear end of slot 27, we preferably mount a reenforcing plate or casting 31 which, among other things, carries a thickened rib or flange 32 which is conformed to the semi-circular shape of the rear end of slot 27 and acts as a reenforced stop for the rearward motion of king-pin 28 when it reaches the rear end of the slot. Casting 31 also carries the upright pivot pin 33 on which the horizontally swinging locking dog 34 is pivoted. This locking dog swings between the open position shown in dotted lines in Fig. 5 and the closed position shown in full lines in that figure, and is held in the closed position by latch bolt 35. A finger 36 is integrally associated with locking dog 34, swinging with it about pivot 33. When the locking dog is in its open position finger 36 lies in the position shown in dotted lines in Fig. 5, in such relation to slot 27 that the rearwardly moving king-pin strikes the finger and moves it and locking dog 34 to the position shown in full lines in Fig. 5 as the king pin brings up against the rear end of slot 27. As dog 34 swings from its open to closed position, the beveled surface 34a at its outer end engages the beveled end surface 35a of latch bolt 35, pushing the latch bolt rearwardly in its slide guide 41 against the tension of a spring, and the spring then throws the latch bolt to its latching position shown in full lines in Fig. 5 when locking dog 34 has passed to its fully closed position shown in full lines. The king-pin 28 is thus fully locked in draft relation with the trailer, and cannot be unlocked for forward movement relative to the trailer until latch bolt 35 is withdrawn.

The locking dog and latch bolt here described are merely typical and illustrative of known devices which have the function of locking the king pin. For instance, the latch bolt 35 may be looked at as the effective locking unit of the draft lock.

Figure 2:
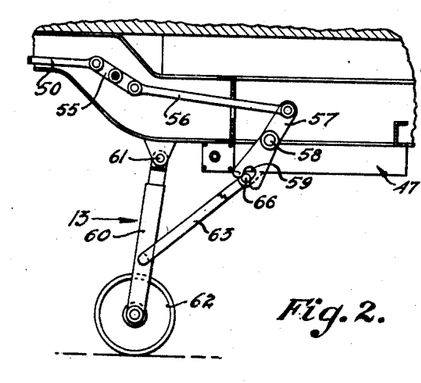
Figs. 2 and 3 are enlarged longitudinal vertical sections showing a typical form of trailer support in, respectively, its lowered operative and raised inoperative positions, and showing the connective media between our interlocking mechanism and this typical trailer support.
Figure 3:
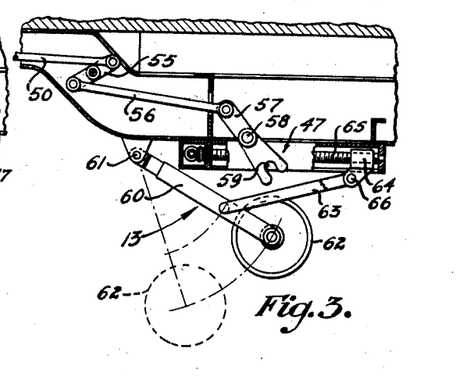

One arm 42 of a bell-crank lever engages latch bolt 35. The bell-crank lever is pivoted at 43 and its other and longer arm 44 has a ball-shaped end 44a which moves back and forth longitudinally between the rearward position shown in full lines in Fig. 5 and forward positions which are generally typified by the position indicated in dotted lines in that figure. The lever end 44a projects through the longitudinal slot 45 in one side wall 46 of a box-shaped casing 47 and engages lock controlling slider 48 which is guided by the casing. Slider 48 is pivotally mounted near its rear end at 49 on the forward end of a coupling rod 50, the rear end of which is shown in Figs. 2 and 3. A suitable aperture through the rear end 51 of box 47, or a similar aperture through the transverse frame member 30, forms a guide for the longitudinally sliding forward end of coupling rod 50.

Figure 5:
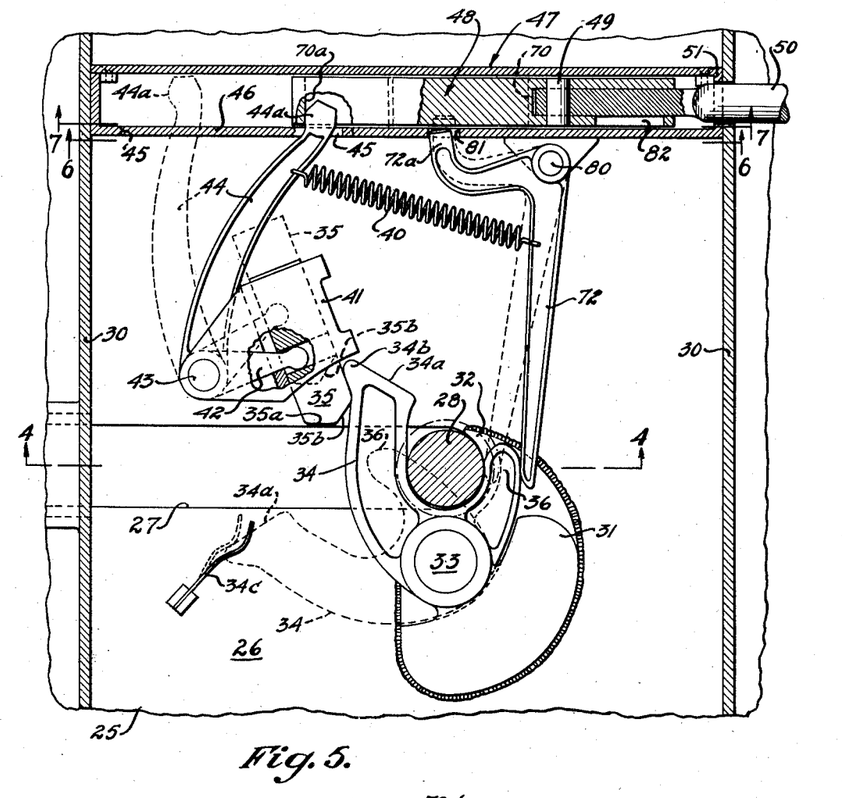
Fig. 5 is a still further enlarged horizontal or plan section taken as indicated by line 5—5 of Fig. 4.
Figure 6:
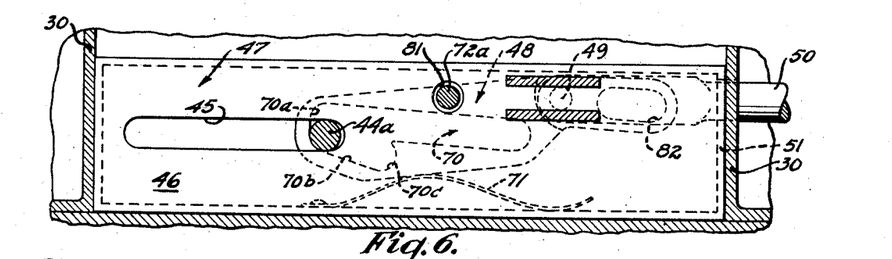
Fig. 6 is a longitudinal vertical section and elevation taken as indicated by line 6—6 on Fig. 5, and showing one typical position of the interlock mechanism.
Figure 8:
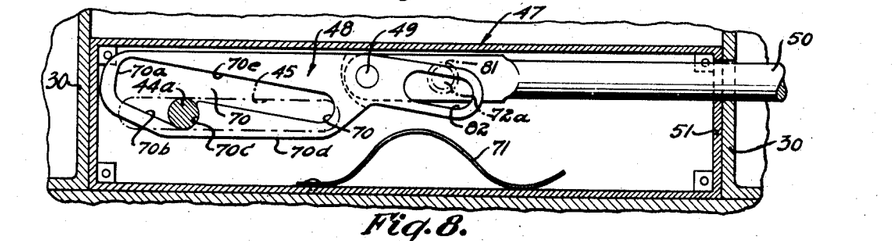
Figure 9:
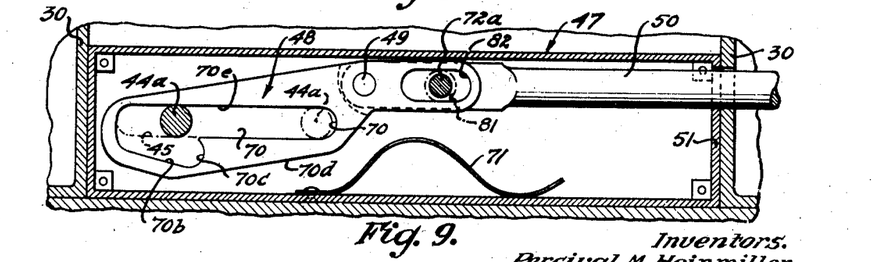

Rod 50 is moved back and forth longitudinally by virtue of the raising and lowering of trailer support 13. In the particular and illustrative arrangement here shown, rod 50 is in its forward position (such as shown in Figs. 8 and 9) when trailer support 13 is lowered as shown in Fig. 2, and is in its rearward position, such as shown in Figs. 5 and 6, when the trailer support 13 is raised, as shown in Fig. 3. As applied to the particular and typical trailer support shown in Figs. 2 and 3, the rear end of coupler rod 50 is pivotally connected to one end of a centrally pivoted lever 55, the other end of which is connected by connecting link 56 to the upper end of a lever 57, medially pivoted at 58, and having a notch 59 in its lower end. The typical known support mechanism as here illustrated comprises a leg or pair of legs 60 pivoted to the trailer frame at 61 and having a wheel or wheels 62 at their lower swinging ends. A pivoted link 63 connects the legs or leg frame with a traveler 64 which may be traveled longitudinally by any suitable means, as by a longitudinal screw 65 operated in any suitable manner and by any suitable power, as for instance manually.

A pin 66 mounted on traveller 64, engages in lever notch 59. When the parts arrive at the trailer-supporting position shown at Fig. 2, lever 57 and the coupling rod 50 are in the position shown in that figure, with the coupling rod in its foremost position as shown in Figs. 2, 8 and 9. When the devices are operated to move the trailer support toward its inoperative position of Fig. 3, coupling rod 50 is moved to its rearmost position. It may be noted from Figs. 2 and 3 that lever 57 is so dimensioned and located that it moves between its two positions during the forward part of the motion of traveller 64, and during the forward part of the travel of wheels 62 while they are in and near their lowermost positions. The arrangement is such that rod 50 and slider 48 leave their foremost positions immediately when wheels 62 start rearwardly, and reach their rearmost positions before the wheels have moved beyond a position in which they can support the trailer; such as wheel position shown diagrammatically in dotted lines in Fig. 3. In the particular arrangement illustrated the pin 66 leaves notch 59 during the latter part of rearward travel; but the slider 48 and rod 50 are held to the rear by a spring, as will be seen. While the motion transmitting parts may be arranged to keep engagement with the support mechanism throughout its movement, it may be preferable to have them disengaged while the support is up, and held in the position of Fig. 3 by a means independent of the support. If then the support or its operating mechanism should be damaged in travel, the motion transmitting parts will still be held in position to keep the king-pin locked, although the support may have dropped.

When the trailer support is inoperative (raised) and the king-pin is locked to the trailer, the parts are in the positions shown in full lines in Figs. 5 and 6. In this position the lock controlling slider 48 is to the rear and the end 44a of arm 44, which is then in its rearmost position in slot 45, engages the forward end 70a of the longitudinal slot 70 in slider 48. In this position of the slider it is supported by the leaf spring 71, and the lower rearwardly sloping wall 70b of slot 70 is pressed up against arm end 44a. Arm 44 is yieldingly held in its rearmost position by the rather strong spring 40 which is attached to that arm and also to the arm 72 of a locking lever whose function will be afterwards described. In order to move arm 44 forwardly and to retract latch-bolt 35 to release locking dog 34 it is necessary to move slider 48 forwardly, and that can only be done, (conveniently at least) by lowering trailer support 13. Thus, as long as the trailer support is not lowered the king-pin cannot be unlocked.

Figure 7:
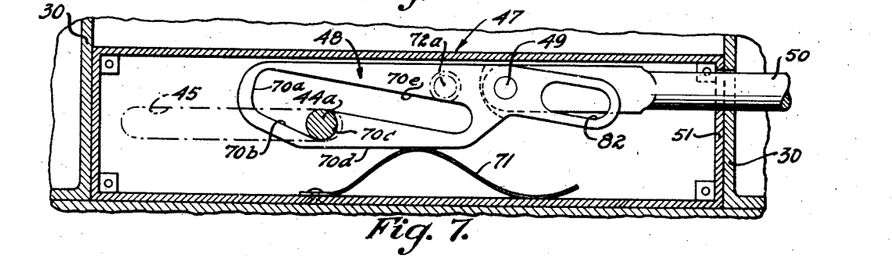
Figs. 7, 8 and 9 are sections taken as indicated by line 7—7 on Fig. 5 and showing the interlock mechanism in several successive typical positions.

As trailer support 13 approaches its lower operative position slider 48 starts forwardly and first reaches the position shown in Fig. 7. In this position the slider has moved forwardly and upwardly under the influence of spring 71, so that arm end 44a is then caught in the forwardly facing hook or catch portion 70c of the lower wall of slot 70. This hook 70c forms a disconnectible connective formation in the control train between the trailer support and the latch unit of the draft lock. By this time trailer support 13 is in good supporting position. As the slider then moves further forwardly, arm 44 is moved forwardly with it, against the tension of spring 40. Slider 48 is also temporarily supported, during this final forward movement, by that hook engagement with arm end 44a. Thus, in its forward movement, slider 48 finally reaches the forward position shown in Fig. 8 when trailer support 13 reaches its final lowered position shown in Fig. 2.

In the meantime the bottom surface 70d of slider 48 has ridden off the supporting spring 71.

The parts are then in the position shown in Fig. 8, and arm 44 and latch bolt 35 are in the positions shown in dotted lines in Fig. 5. In that position of latch bolt 35, an inclined surface 35b at its outer end is adapted to be engaged by tip 34b of locking dog 34 as the locking dog swings toward its open position shown in dotted lines in Fig. 5. The latch bolt is now in its lock releasing, or king bolt releasing, position. Thus, with the parts in the position just previously explained, and with the trailer braked or chocked so that it cannot move forwardly, king-bolt 28 will move forwardly relative to the trailer when the tractor drives forwardly, locking dog 34 will be swung from its full line position in Fig. 5 to its dotted line position, and latch bolt 35 will momentarily be pushed back slightly beyond the releasing position shown in dotted lines in Fig. 5 as the locking-dog passes it. This temporary displacement of the latch bolt to its fully open position throws arm 44 momentarily a short distance to the left of the position shown in Fig. 8 and in dotted lines in Fig. 5, removing the end of the arm from hook 70c. This action disconnects the control connection through which the lowering of the support has released the draft lock. Slider 48 is thereby immediately released to swing down to the position shown in Fig. 9 where the upper wall 70e of slot 70 rests on arm end 44a. Immediately this occurs, spring 40 moves arm 44 back to the position shown in dotted lines in Fig. 9, which is the same position as shown in full lines in Figs. 5 and 6. Latch bolt 35 at the same time moves back to the full line position of Fig. 5.

When coupling rod 50 reaches its foremost position, it is then ready to be locked in that position, and trailer support 13 consequently locked in its lowered operative position, by a locking device which can only be released by the action of locking the tractor king-pin to the trailer when the tractor subsequently picks up the trailer. In the arrangement and design illustrated in Fig. 5 this locking device includes a lever pivoted at 80 and having one arm 72 engageable by the rear side of finger 36. The other arm 72a of this lever has an end adapted to be projected through the opening 81 in wall 46 of casing 47, and adapted to enter a slot 82 formed in slider 48. In the particular design as here shown, slot 82 is formed in a part or slider 48 which extends to the rear of the slider pivot 49, and as a consequence the locking arm 72a cannot enter slot 82 until slider 48 has dropped from the position shown in Fig. 8 to the position shown in Fig. 9. As explained before, that dropping of the slider is caused by the forward removal of king-pin 28. And locking lever arm 72 cannot be moved forwardly by spring 40 until the king-pin is removed and finger 36 thrown forwardly. Immediately upon removal of the king-pin (which can only be accomplished after coupler rod 50 and slider 48 have been put in their forward positions) locking arm 72a enters slot 82 to prevent subsequent rearward movement of rod 50 and slider 48, and prevent raising of the trailer support, until the king-pin has been reinserted and locked in position.

It is preferable to lock slider 48 in its forward position only after the king-pin has been removed. If it were locked forward immediately on reaching that forward position it would be necessary to remove and reinsert the king-pin before the trailer support could be raised. By providing only for locking the slider when the king-pin is finally removed, it is possible for the operator to raise the trailer support at any time after lowering it and before removal of the king-pin. After removal of the king-pin the slider and trailer support remain locked until the pin is reinserted and fully locked. Slot 82 is made somewhat long so as to not require too great nicety in the positioning of the trailer support 13 and to allow for other variations in the manufacture and operation of the whole mechanism. At the same time engagement of locking arm 72a in slot 82 prevents coupling rod 50 from being moved far enough toward the rear to render trailer support 13 inoperative.

By the foregoing described functions of the mechanism, the king-pin is locked to the trailer as long as the trailer support is inoperative, and the trailer support is locked in its trailer supporting position as long as the king-pin is not locked in the position shown in Fig. 5. As long as the king pin is out of that position, locking dog 34 with its finger 36 remain in the position shown in dotted lines in Fig. 5, while latch-bolt 35 and lever arm 44 remain in the position as shown in full lines in Fig. 5, and slider 48 remains in the position shown in Fig. 9, locked by the locking arm 72a. Arm 72 of the locking lever can only be moved toward the rear, to unlock slider 48 and coupling rod 50, by swinging finger 36 to the full line position shown in Fig. 5. This can only be done by inserting the king-bolt to the position shown in full lines in Fig. 5; and the insertion of the king-bolt to that position throws locking dog 34 past latch bolt 35 to the full line position of Fig. 5 where the locking dog is latched to lock the king-pin to the trailer. Only when the parts are in that position can slider 48 be moved rearwardly and trailer support 13 be moved out of its trailer supporting position.

As king bolt 28 and dog 34 approach the full line positions of Fig. 5, locking arm 72a preferably does not clear the slider 48 and release it until after dog nose 34b has passed the high point on the end of latch 35 and is then riding on the inclined latch surface 34b. If then for any reason latch 35 does not move in to its full line position to latch dog 34, either one or the other of two things occurs. Latch arm 44 is then held forward by the latch and the arm holds slider 48 forward and holds support 13 down. On the other hand, if the support is forced up, it can only move up by moving arm 44 to the rear and forcing latch 35, dog 34 and the king bolt to their final and fully locked positions.

Figure 5A:
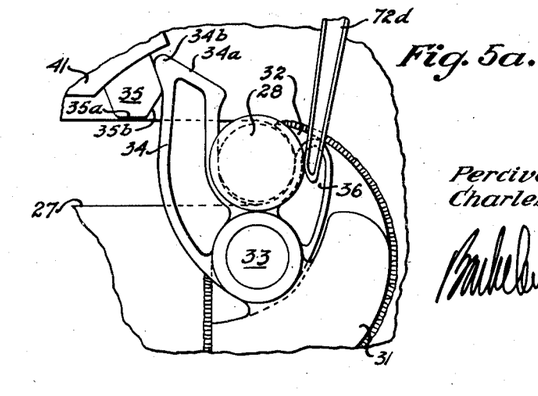
Fig. 5a is a fragmentary view of a variant arrangement of certain parts shown in Fig. 5, in the same aspect as in that figure.

In the particular type of king-pin lock which we have illustrated, the primary function of finger 36 is to throw locking dog 34 to its closed position on insertion of the king-pin. On that insertion, and on withdrawal of the king-pin, finger 36 moves with the king-pin, and consequently locking lever 72 may be said to be operated by king-pin movement. The only circumstance under which finger 36 could reach its position of Fig. 5 and unlock slider 48 without the king-pin being locked behind dog 34, would be that in which dog 34 has been accidentally moved from its dotted line position (Fig. 5) to project across slot 27 to be struck by the rearwardly moving pin. That is prevented by the catch spring 34c. Such mis-operation may also be prevented by making locking lever 72 directly operable by the king-pin, independently of finger 36. Fig. 5a shows such an arrangement, where locking arm 72d is engaged and moved directly by the king-pin. In both these forms for the actuation of arm 72, that arm and locking arm 72a may be said to be operated either by virtue of king-pin movement, insertion or withdrawal, or by virtue of the coupler lock being open or closed; as the king-pin movement and lock operation necessarily accompany each other in the normal operation of the device.

We have mentioned the fact that the king-pin lock (locking dog 34, closing finger 36 and latch 35) is merely illustrative of any suitable coupling lock. For the particularly preferred mode of operation that has been explained it is preferred that this coupling lock be of the type that locks or latches automatically when the king-pin is inserted; but even with that preference a large variety of locks may be utilized. For instance, in the illustrated design, the latch 35 itself may be considered as the lock; the king-pin could, in all essentials, be locked directly behind it instead of indirectly with the interposition of dog 34. The interposition of the locking dog gives a better bearing engagement with the king-pin.

A sequential summary of the several operations of the interlock mechanism will now be helpful to an understanding of the detailed functions of the various parts, and an understanding of the advantages of the preferred structures over other and possible variants.

Starting with the support in its raised, non-supporting position, and with the king-pin locked in place;

(1) Lowering the support moves the interconnected slider forwardly. The slider engages the latch arm (through the hook engagement) and moves it to open the latch (the lock) far enough that the king-pin may then be pulled out.

(2) The act of removing the king-pin disengages the latch (lock) from the slider, thus allowing the latch (lock) to return immediately to its potential king-pin holding condition, urged by its spring. Specifically, this operation is accomplished by making the outwardly moving king-pin push the latch further open, thus disengaging the hook connection between the slider and latch, allowing the latch to return by reason of the lost motion (slotted) connection between the latch and slider.

It is preferred that the lock be re-set in its potential king-pin holding condition by virtue of the outward movement of the king-pin. However it is only necessary that king-pin movement (either out or in) act to re-set the lock so that it is capable of locking the king-pin when fully reinserted; as both those king-pin movements take place before the support is released so that it can be raised.

(2a) The act of removing the king-pin also (via locking arm 72) locks the slider in its position (forward) where it positively holds the trailer support in its lowered operative position. The parts are now in such condition that the support cannot be raised until the king-pin is reinserted and locked and releases the slider lock.

(3) On reinserting the king-pin past the freely yielding latch (lock) the latch immediately passes the king-pin and locks it in place. In reaching its locked position the king-pin operates the slider lock (arm 72) to release it.

(4) The unlocked slider and the interconnected support may now be moved back to their original positions, with the support elevated and the slider to the rear. In this position the slider, as well as the latch spring, holds the latch closed (holds latch arm 44 back) so that the king-pin cannot now be removed until the support is lowered and the slider moved forward to open the latch, or allow it to open.

If the mechanism now be visualized without any free or lost motion between latch arm 44 and slider 48, and with the latch and arm merely moving back and forth with the slider; it will immediately be seen that the latch will then simply be open when the support is down and closed when the support is up. In that case the king-pin will be locked in position only when the support is raised after inserting the king-pin, and not locked in place immediately on insertion.

On the other hand, if the structure and function of the hook formation (70c) be omitted and the latch arm be allowed to have simple lost motion (in the slider slot) relative to the slider, then the bevel (35b) on the latch would have to be of such extent that the outwardly moving king-pin would throw the latch through its whole outward opening throw instead of merely through the limited throw as described. In that case it would then be necessary, in order to hold the latch closed against king-pin draft, to hold the slider rearwardly by some positive action, as by being positively connected to the raised support mechanism; and draft forces would necessarily be taken by the various interconnected parts.

The particular advantageous feature, then, of allowing lost motion between the latch and slider lies in the fact that the king-pin is locked immediately on insertion. And there are several particular advantageous features flowing from the hooked engagement of the slider and latch, and from opening the latch by forward slider movement and then freeing the latch from the slider on king-pin withdrawal. The lock, within its own mechanism, holds the king-pin positively locked. There are no draft strains placed upon any other parts, the latch need not be positively held against opening, and the slider need not be positively connected to the support mechanism when the support is raised.

We claim:

1. In a tractor and semi-trailer combination in which the tractor and trailer are provided with interengaging draft elements including a releasable draft-lock on one vehicle operable to unlockingly engage the draft element of the other vehicle when the latter is inserted, and in which the trailer is provided with a support movable between supporting and non-supporting positions by means independent of the tractor draft element; interlocking mechanism acting between the movable support and the draft lock to prevent the draft lock from being released until the support has been placed substantially in supporting position, and to positively prevent movement of the support from supporting position until the draft lock has been lockingly engaged, said mechanism including means operating to automatically and positively release the draft lock by virtue of final movement of the support into full supporting position.

2. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; mechanism whereby the support controls the draft lock in such manner as to require the support to be substantially in supporting position before the draft lock can be released, and associated mechanism whereby the draft lock positively controls the support in such manner as to require the draft lock to be fully engaged before the support can be moved from supporting position, said mechanism including means operating to automatically and positively release the draft lock by virtue of final movement of the support into full supporting position.

3. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; a draft-lock controlling element movably mounted on one vehicle and connected with the trailer support to move therewith, a locking member adapted to hold the controlling element against movement and releasable by entry of the second mentioned draft element in the draft-lock, and connective means whereby movement of the controlling element in its direction of movement that accompanies the placement of the support in supporting position causes release of the draft lock.

4. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; a draft-lock controlling element carried by one vehicle and connected with the movable support to move back and forth as the support is placed in supporting and non-supporting positions, a locking member adapted to hold the controlling element in its position corresponding to supporting position of the support, said locking member releasable by entry of the second mentioned draft element in the draft-lock, said draft-lock being spring closing, and lost motion connective means between the controlling element and the draft-lock whereby the draft-lock is released when the controlling element is moved to its last mentioned position.

5. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; said draft lock including a spring closing latch, a longitudinally slotted slider carried by one vehicle and connected with the movable support to slide back and forth as the support is placed in supporting and non-supporting positions, a locking member adapted to hold the slider in its position corresponding to supporting position of the support, said locking member releasable by entry of the last mentioned draft element in the draft-lock, and a draft-lock operating arm extending into the slider slot and movable in the plane of that slot to release and apply the draft-lock.

6. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; said draft lock including a spring closing latch having a bevel on its rear face whereby removal of the second mentioned draft element from the draft-lock causes opening of the latch by an amount more than the normal opening movement of the latch, a longitudinally slotted slider carried by the trailer and connected with the movable support in such manner as to be free to move in a vertical plane but to move back and forth as the support is placed in supporting and non-supporting positions, a draft-lock operating arm extending into the slider slot and movable in the plane of back and forth movement of the slider, the lower wall of the slider slot having intermediate its ends a hook formation adapted to engage and hold the lock operating arm when the slider moves toward its position corresponding to the support being in supporting position, and a locking member adapted to hold the slider in its last mentioned position, said locking member releasable by entry of the last mentioned draft element in the draft-lock.

7. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; said draft lock including a spring closing latch mechanism, having a bevel on its rear face whereby removal of the second mentioned draft element from the draft-lock causes opening of the latch by an amount more than the normal opening movement of the latch, a horizontally movable connective member connected with the support to move back and forth as the support is moved to supporting and non-supporting positions, a slider pivotally connected near one end with said connective member to move horizontally with it and to swing vertically, means for supporting the slider during that portion of its movement near its position corresponding to the non-supporting position of the trailer support, the slider having a longitudinal slot the lower wall of which is provided with a hook formation facing in the direction in which the slider moves when the trailer support is moved to supporting position, a draft-lock operating arm connected to the spring latch, extending into the slider slot, and movable in the plane of slider movement, said arm adapted to be engaged by the hook formation and moved thereby in a direction to normally open the latch, and a locking member adapted to hold the slider in its last mentioned position, said locking member releasable by entry of the second mentioned draft element in the draft-lock.

8. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; said draft lock including a spring closing latch mechanism, having a bevel on its rear face whereby removal of the second mentioned draft element from the draft-lock causes opening of the latch by an amount more than the normal opening movement of the latch, a latch controlling member connected to and movable with the trailer support, said controlling member having a catch formation adapted to engage the latch mechanism to move it partially toward open position when the controlling member moves to its position corresponding to the supporting position of the trailer support, said catch formation releasable by further opening movement of the latch mechanism occasioned by removal of the second mentioned draft element from the draft-lock, and a locking member adapted to hold the controlling member in its last mentioned position, said locking member releasable by entry of the second mentioned draft element in the draft-lock.

9. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; said draft lock including a spring closing latch mechanism so constituted as to be movable through the last part of its opening movement by forcible removal of the second mentioned draft element from the draft lock, a latch controlling member connected to and movable with the trailer support, said controlling member having a catch formation adapted to engage the latch mechanism to move it partially toward open position when the controlling member moves to its position corresponding to the supporting position of the trailer support, said catch formation releasable by further opening movement of the latch mechanism occasioned by removal of the second mentioned draft element from the draft-lock, and a locking member adapted to hold the controlling member in its last mentioned position, said locking member releasable by entry of the second mentioned draft element in the draft-lock.

10. In a tractor and semi-trailer combination in which the tractor and trailer are provided with interengaging draft elements including a releasable draft lock on one vehicle automatically operable to lockingly engage the draft element of the other vehicle when the latter is inserted, and in which the trailer is provided with a support movable between supporting and non-supporting positions; mechanism operatively connecting the movable support with the draft lock, said mechanism including disconnectible lock operating means adapted to cause positive release of the draft lock, to automatically free the second mentioned draft element for removal from the draft lock, upon movement of the support to supporting position, and means associated with the disconnectible operating means and by which the disconnectible operating means is disconnected by virtue of movement of the second mentioned draft element relative to the draft lock, to free the draft lock from operative connection with the support so that the draft lock may then lockingly engage the second mentioned draft element upon subsequent insertion.

11. In a tractor and semi-trailer combination in which the tractor and trailer are provided with interengaging draft elements including a releasable draft lock on one vehicle automatically operable to lockingly engage the draft element of the other vehicle when the latter is inserted, and in which the trailer is provided with a support movable between supporting and non-supporting positions; mechanism operatively connecting the movable support with the draft lock, said mechanism including disconnectible lock operating means adapted to cause positive release of the draft lock, to automatically free the second mentioned draft element for removal from the draft lock, upon movement of the support to supporting position, means associated with the disconnectible operating means and by which the disconnectible operating means is disconnected by virtue of movement of the second mentioned draft element relative to the draft lock, to free the draft lock from operative connection with the support so that the draft lock may then lockingly engage the second mentioned draft element upon subsequent insertion, and means controlled by the draft lock for securing the support in its supporting position.

12. In a tractor and semi-trailer combination in which the tractor and trailer are provided with interengaging draft elements including a releasable draft lock on one vehicle automatically operable to lockingly engage the draft element of the other vehicle when the latter is inserted, and in which the trailer is provided with a support movable between supporting and non-supporting positions; said lock including a locking member movable between closed and open positions, and a latch adapted to automatically latch the locking member when closed; mechanism operatively connecting the movable support with the latch, said mechanism including disconnectible latch operating means adapted to cause positive withdrawal of the latch, to free the locking member for opening, upon movement of the support to supporting position, means whereby the latch is disconnected from the support by reason of movement of the locking member between its closed and open positions, and means whereby the support is secured in supporting position whenever the locking member is open.

13. In a tractor and semi-trailer combination in which the tractor and trailer are provided with interengaging draft elements including a releasable draft lock on one vehicle automatically operable to lockingly engage the draft element of the other vehicle when the latter is inserted, and in which the trailer is provided with a support movable between supporting and non-supporting positions; said lock including a locking member movable between closed and open positions, and a latch adapted to automatically latch the locking member when closed; mechanism operatively connecting the movable support with the latch, said mechanism including disconnectible latch operating means adapted to cause positive withdrawal of the latch, to free the locking member for opening, upon movement of the support to supporting position, and means whereby the latch is disconnected from the support by virtue of movement of the locking member between its closed and open positions.

14. In a tractor and semi-trailer combination in which the tractor and trailer are provided with interengaging draft elements including a releasable draft lock on one vehicle, said draft lock including a locking member movable between closed and open positions by insertion and removal of the draft element of the other vehicle, and a latch adapted to automatically latch the locking member when closed, and the trailer being provided with a support movable between supporting and non-supporting positions; interlocking mechanism coupling the movable support with the draft lock, said mechanism including coupling means for positively and automatically withdrawing the latch, to free the locking member for opening, by virtue of movement of the support to supporting position, and means independent of the latch and operated by opening the locking member to secure the support in supporting position, said means being releasable by subsequent closure of the locking member.

15. In a tractor and semi-trailer combination in which the tractor and trailer are provided with interengaging draft elements including a releasable draft lock on one vehicle, said draft lock including a locking member movable between closed and open positions by insertion and removal of the draft element of the other vehicle, and a latch adapted to automatically latch the locking member when closed, and the trailer being provided with a support movable between supporting and non-supporting positions; interlocking mechanism operatively connecting the movable support with the draft lock, said mechanism including disconnectible latch operating means for positively and automatically withdrawing the latch, to free the locking member for opening, by virtue of movement of the support to supporting position, means whereby the latch operating means is disconnected by virtue of opening movement of the locking member when the second mentioned draft element is withdrawn, so as to free the latch to automatically latch the locking member when subsequently closed, and means independent of the latch and operated by opening the locking member to secure the support in supporting position, said means being releasable by subsequent closure of the locking member.

16. In a tractor and trailer combination in which the two vehicles are provided with interengaging draft elements including a releasable draft lock on one vehicle automatically operable to lockingly engage the draft element of the other vehicle when the latter element is inserted, and in which the trailer is provided with a support movable between supporting and non-supporting positions; said draft lock including a locking unit which is movable through the last part of its opening movement by forcible removal of the second mentioned draft element from the draft lock, mechanism connecting the movable support with said unit of the draft lock, said mechanism including a lock controlling member connected to and movable with the trailer support and having a connective formation operative to engage and move said draft lock unit partially toward open position when the controlling member moves to its position corresponding to the supporting position of the trailer support, and said connecting mechanism being disconnectible at said connective formation by reason of movement of said locking unit to fully open position.

17. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; said draft lock including a spring closing latch mechanism so constituted as to be movable through the last part of its opening movement by forcible removal of the second mentioned draft element from the draft lock, a latch controlling member connected to and movable with the trailer support, said controlling member having a catch formation adapted to engage the latch mechanism to move it partially toward open position when the controlling member moves to its position corresponding to the supporting position of the trailer support, and said catch formation releasable by further opening movement of the latch mechanism occasioned by removal of the second mentioned draft element from the draft-lock.

18. In a tractor and semi-trailer combination in which the tractor and trailer are provided with interengaging draft elements including a releasable draft-lock on one vehicle operable to lockingly engage the draft element of the other vehicle when the latter is inserted, and in which the trailer is provided with a support movable between supporting and non-supporting positions by means independent of the tractor draft element; said draft lock including a spring closing latch having a bevel on its rear face whereby removal of the second mentioned draft element from the draft-lock causes opening of the latch by an amount more than the normal opening movement of the latch, a longitudinally slotted slider carried by the trailer and connected with the movable support in such manner as to be free to move in a direction transversely of its slot but to move longitudinally back and forth as the support is placed in supporting and non-supporting positions, a latch operating arm extending into the slider slot and movable in the direction of longitudinal movement of the slider, a lateral wall of the slider slot having intermediate its ends a hook formation adapted to engage the latch operating arm and move it to normally open the latch when the slider moves to its position corresponding to the supporting position of the trailer support.

PERCIVAL M. HEINMILLER.
CHARLES F. ROGINSON.